(12) United States Patent
Hasui et al.

(10) Patent No.: US 8,599,444 B2
(45) Date of Patent: Dec. 3, 2013

(54) IMAGE PROCESSING APPARATUS AND METHOD FOR CONTROLLING THE SAME

(75) Inventors: Shigeki Hasui, Tokyo (JP); Tatsuru Baba, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 794 days.

(21) Appl. No.: 12/748,647

(22) Filed: Mar. 29, 2010

(65) Prior Publication Data

US 2010/0271668 A1 Oct. 28, 2010

(30) Foreign Application Priority Data

Apr. 27, 2009 (JP) ................................. 2009-108459

(51) Int. Cl.
*H04N 1/04* (2006.01)

(52) U.S. Cl.
USPC .......... 358/474; 358/1.13; 358/1.15; 358/410; 358/448

(58) Field of Classification Search
USPC ................. 358/1.13, 1.15, 410, 448, 474
See application file for complete search history.

(56) References Cited

U.S. PATENT DOCUMENTS

| | | | |
|---|---|---|---|
| 5,615,281 A * | 3/1997 | Yamaguchi | 382/162 |
| 7,565,011 B2 | 7/2009 | Matsunaga et al. | |
| 2002/0051230 A1 * | 5/2002 | Ohta | 358/448 |
| 2006/0098229 A1 | 5/2006 | Matsunaga et al. | |
| 2007/0038971 A1 * | 2/2007 | Hiramatsu et al. | 716/16 |
| 2007/0285716 A1 * | 12/2007 | Ohmiya | 358/1.16 |
| 2008/0002065 A1 * | 1/2008 | Waseda | 348/714 |
| 2008/0240584 A1 * | 10/2008 | Saiga et al. | 382/232 |
| 2009/0243978 A1 * | 10/2009 | Yamamoto et al. | 345/76 |

FOREIGN PATENT DOCUMENTS

| | | |
|---|---|---|
| JP | 2001-051826 A | 2/2001 |
| JP | 2005-202667 A | 7/2005 |
| JP | 2006-065786 | 3/2006 |
| JP | 2006065786 A * | 3/2006 |
| JP | 2006-140601 A | 6/2006 |
| JP | 2006-285792 | 10/2006 |
| JP | 2007-304887 A | 11/2007 |
| JP | 2008-242850 A | 10/2008 |

OTHER PUBLICATIONS

Japanese Office Action dated Feb. 15, 2013, issued in counterpart Japanese Application No. 2009-108459.

* cited by examiner

*Primary Examiner* — Allen H Nguyen
(74) *Attorney, Agent, or Firm* — Fitzpatrick, Cella, Harper & Scinto

(57) ABSTRACT

An image processing apparatus includes a plurality of circuit configuration units, each of which can be reconfigured into one of a plurality of types of circuit configurations, and reduces the overhead incurred in the switching time period by fixing a circuit configuration of an optimal type in accordance with the frequency of appearance of pixel data having a certain attribute in a plurality of pixel data and the number of times of switching of the attribute of the pixel data from one to another.

4 Claims, 10 Drawing Sheets

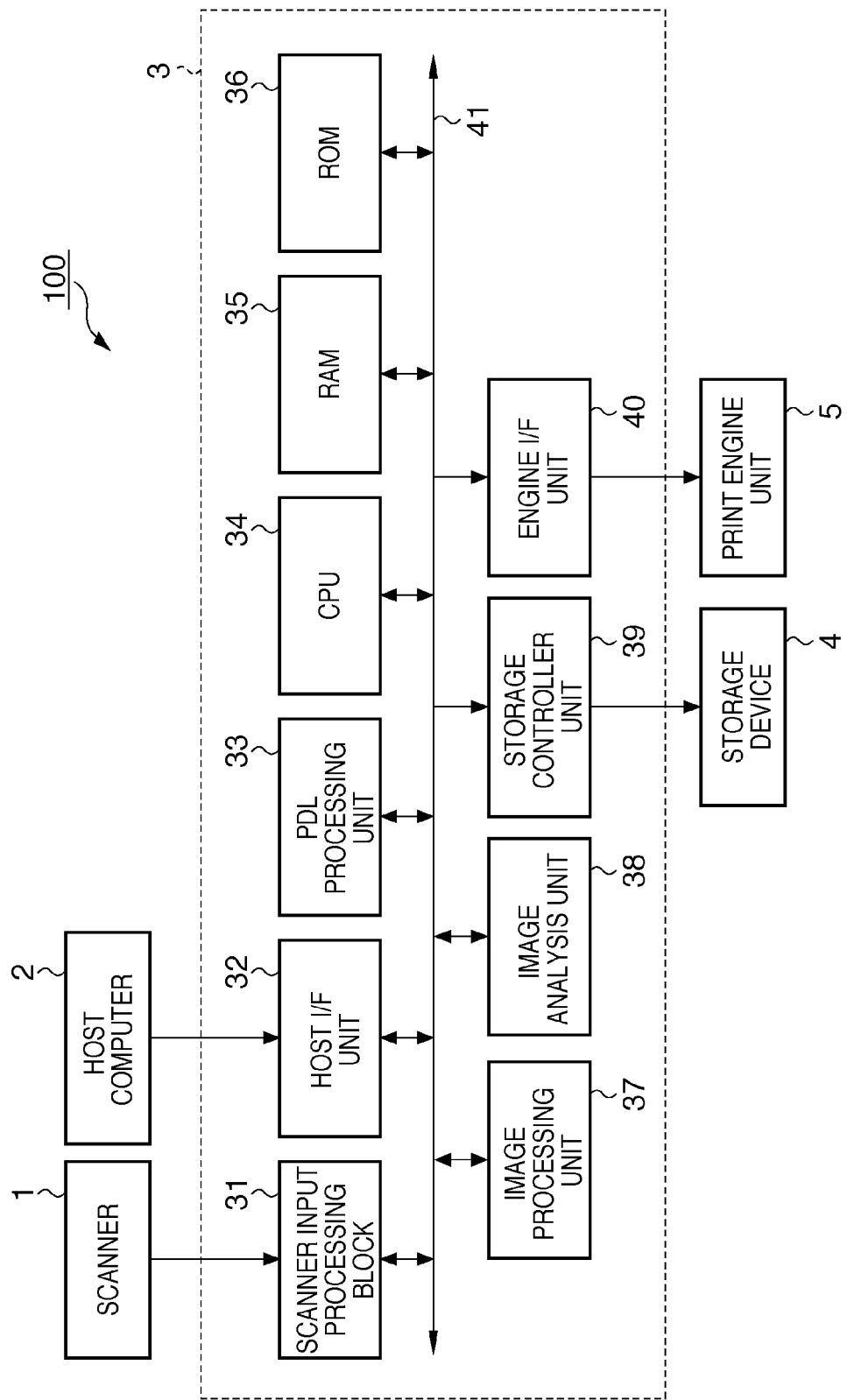

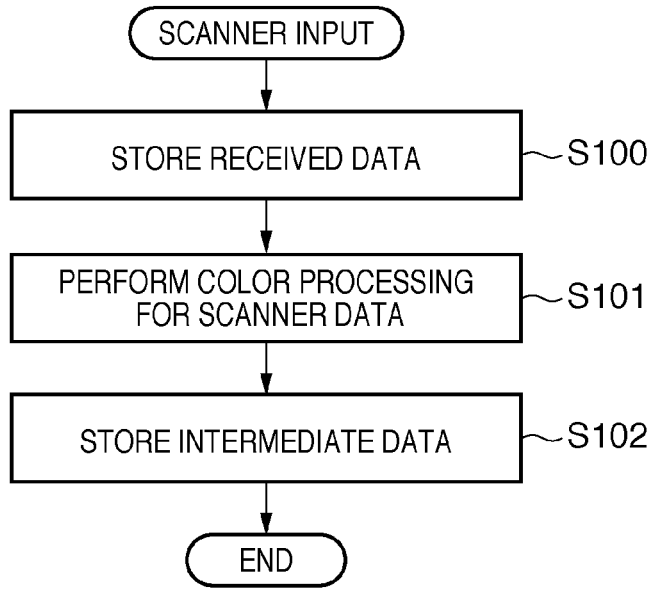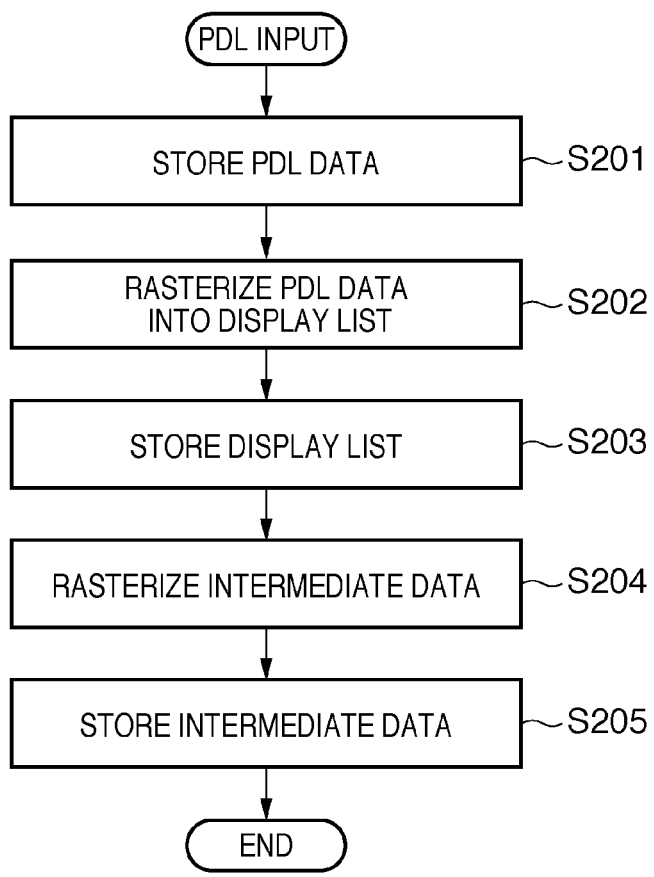

FIG. 10

| ATTRIBUTE TYPE | NUMBER OF APPEARANCES | FREQUENCY OF APPEARANCE | ATTRIBUTE SWITCHING |
|---|---|---|---|
| ATTRIBUTE 1 | 2 | 13% | 0 |
| ATTRIBUTE 2 | 2 | 13% | 1 |
| ATTRIBUTE 3 | 2 | 13% | 2 |
| ATTRIBUTE 4 | 4 | 25% | 3, 7 |
| ATTRIBUTE 5 | 4 | 25% | 4, 6 |
| ATTRIBUTE 6 | 2 | 13% | 5 |

FIG. 11

| ATTRIBUTE TYPE | RECONFIGURATION INFORMATION DATA AMOUNT |
|---|---|
| ATTRIBUTE 1 | 10KB |
| ATTRIBUTE 2 | 15KB |
| ATTRIBUTE 3 | 20KB |
| ATTRIBUTE 4 | 10KB |
| ATTRIBUTE 5 | 5KB |
| ATTRIBUTE 6 | 10KB |

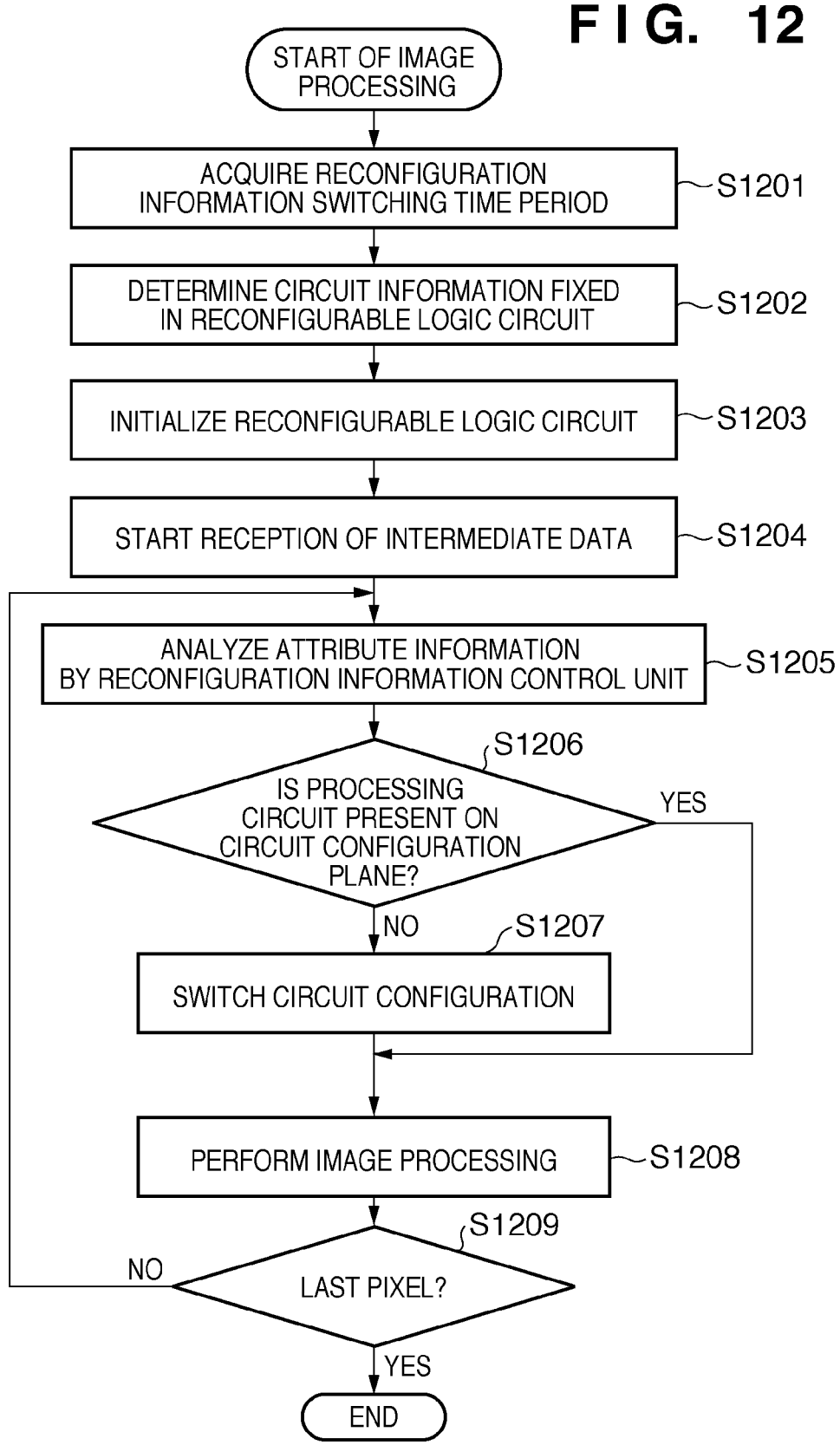

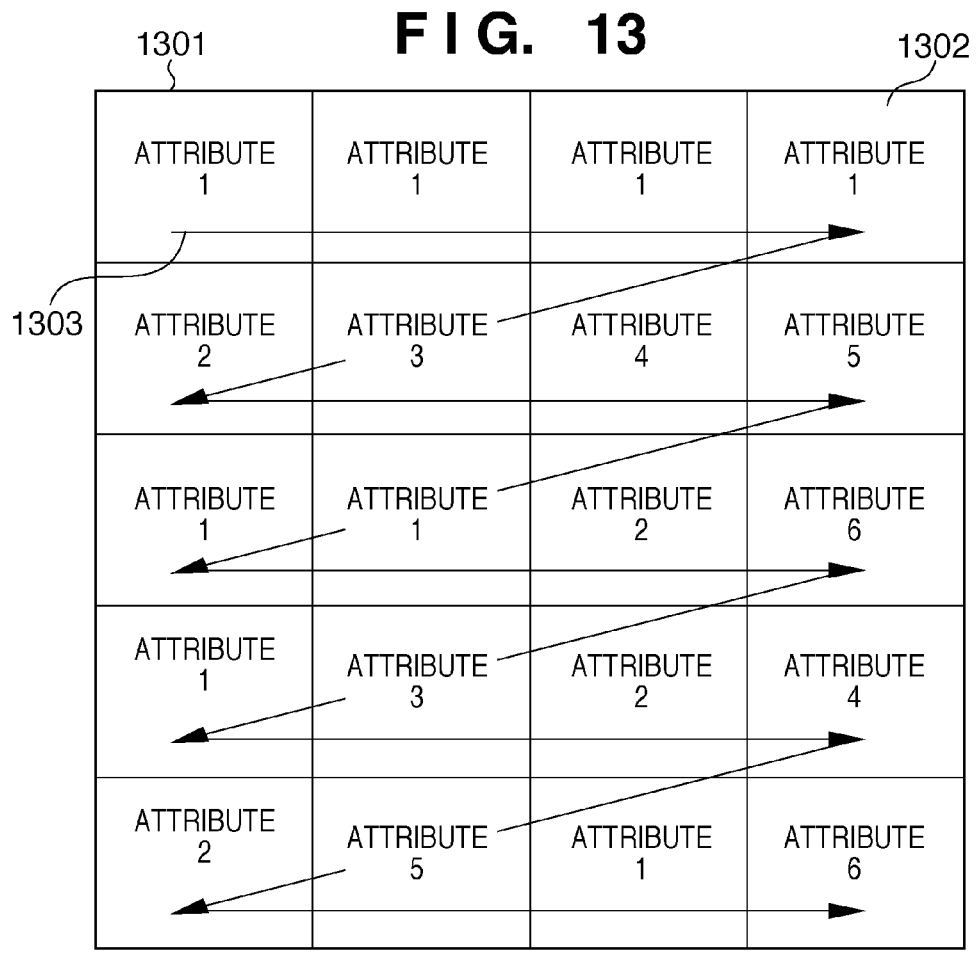

IMAGE PROCESSING APPARATUS AND METHOD FOR CONTROLLING THE SAME

BACKGROUND OF THE INVENTION

1. Field of the Invention

The present invention relates to an image processing apparatus using a logic circuit, which can be reconfigured in operation, and a method for controlling the same.

2. Description of the Related Art

An FPGA (Field Programmable Gate Array) and a CPLD (Complex Programmable Logic Device) have been conventionally known as logic circuits having logical configurations, which can be reconfigured during circuit operation. Also, in recent years, a reconfigurable processor having a logical configuration, which can be more dynamically reconfigured during system operation, is coming into practical use.

Of conventional techniques that use reconfigurable logic circuits as described above, especially those that use reconfigurable processors, have often been proposed. Japanese Patent Laid-Open No. 2006-285792, for example, proposes an apparatus including a processing unit that can perform a plurality of types of image processing, and a control unit that controls the processing unit in accordance with attribute information indicating the contents of image processing for respective pixels, which form the input image. This makes it possible to perform desired image processing while avoiding increases in, for example, the circuit scale and the power consumption using not all types of hardware dedicated to respective types of image processing, each according to attribute information corresponding to a pixel of interest.

Also, Japanese Patent Laid-Open No. 2006-065786 proposes an apparatus including a reconfigurable circuit that has a plurality of logical configurations with variable functions, and a setting unit that sets the functions of the logical configurations. Note that the setting unit reduces the power consumed by a function switching process, by setting the functions of at least some of the plurality of logical configurations to the same function with a high frequency of appearance for a predetermined period.

However, the conventional techniques pose the following problems. A reconfigurable processor has a plurality of circuit configuration planes formed from multifunction elements, which are called PEs (Processor Elements) and have a primitive operation function. The circuit-configuration information (configuration data) of the reconfigurable processor is formed using a PE as a basic unit. For this reason, the reconfigurable processor has configuration data in an amount smaller than those of an FPGA and CPLD formed for each logic gate, and therefore has a circuit that can be reconfigured within a time shorter than those in an FPGA and CPLD.

Nevertheless, it takes a predetermined time to change the circuit configuration of the reconfigurable processor because this change takes place through a plurality of procedures, such as switching trigger detection for the circuit configuration, a circuit operation stop, configuration switching, and a circuit operation restart. Therefore, when image processing is performed for image data to be processed while switching the processing circuit in accordance with the pieces of attribute information of pixels that form the image data, as in the technique described in Japanese Patent Laid-Open No. 2006-285792, the number of times of switching of the configuration data increases as the attribute information is frequently switched. As a result, the temporal overhead incurred in switching the configuration data increases, leading to a lengthy processing time.

Japanese Patent Laid-Open No. 2006-065786 proposes a method for reducing a temporal overhead incurred in frequently switching the configuration data, as described above. The temporal overhead required to switch the configuration data to the one according to a corresponding attribute can be effectively reduced by fixing a processing-circuit function corresponding to a specific attribute with a high frequency of appearance in processed image data to one of the plurality of circuit configuration planes, as described in Japanese Patent Laid-Open No. 2006-065786.

Nevertheless, when image processing is performed for image data by scanning it in a predetermined sequence as in image processing of, for example, a printer, the number of times of switching of the configuration data differs depending on the distribution of attribute information in the scanning direction even when certain pieces of attribute information of pixels that form the image data have the same frequency. The amount of configuration data differs depending on the circuit function and circuit scale to be realized, so the time taken for configuration switching, in turn, changes. In other words, if a given attribute continuously appears in the scanning direction although its frequency of appearance is high, both the number of times of configuration switching and the total time taken for switching may decrease. In contrast, if a given attribute intermittently appears in the scanning direction although its frequency of appearance is low, both the number of times of configuration switching and the total time taken for switching may increase. Furthermore, even if given attributes have the same frequency of appearance, the total time taken for configuration switching may differ if the processing contents differ. That is, it is difficult to optimally fix a processing-circuit function corresponding to an attribute with a high frequency of appearance in processed image data based only on the frequency of appearance of each attribute.

SUMMARY OF THE INVENTION

The present invention enables realization of an image processing apparatus that includes an image processing unit including a plurality of circuit configuration units, each of which can be reconfigured into one of a plurality of types of circuit configurations, and which reduces the overhead incurred in the switching time period by fixing a circuit configuration of an optimal type in accordance with the frequency of appearance of pixel data having a certain attribute in a plurality of pixel data and the number of times of switching of the attribute of the pixel data from one to another, and a method for controlling the same.

One aspect of the present invention provides an image processing apparatus comprising: a plurality of image processing units that have variable circuit configurations; and an input unit that inputs image data; and a control unit that controls the apparatus to perform image processing for the image data, input via the input unit, using the plurality of image processing units. For a duration from the start of the image processing for the image data until the end of the image processing, the control unit controls the apparatus to perform the image processing for the image data with changing a circuit configuration of a first image processing unit of the plurality of image processing units, and controls the apparatus to perform the image processing for the image data without changing a circuit configuration of a second image processing unit, different from the first image processing unit, of the plurality of image processing units.

Another aspect of the present invention provides a method for controlling an image processing apparatus including a plurality of image processing units that have variable circuit configurations, comprising: inputting image data; and controlling the apparatus to perform image processing for the image data, input in the inputting the image data, using the plurality of image processing units. In the controlling of the apparatus to perform the image processing, for a duration from the start of the image processing for the image data until the end of the image processing, control of the apparatus is done to perform the image processing for the image data with changing a circuit configuration of a first image processing unit of the plurality of image processing units, and control the apparatus is done to perform the image processing for the image data without changing a circuit configuration of a second image processing unit, different from the first image processing unit, of the plurality of image processing units.

Further features of the present invention will become apparent from the following description of exemplary embodiments with reference to the attached drawings.

BRIEF DESCRIPTION OF THE DRAWINGS

FIG. 1 is a block diagram illustrating one example of an image processing system 100 according to the first embodiment;

FIG. 2 is a flowchart showing the procedure of processing when an image processing apparatus 3 receives image data from a scanner 1 according to the first embodiment;

FIG. 3 is a flowchart showing the procedure of processing when the image processing apparatus 3 receives PDL data from a host computer 2 according to the first embodiment;

FIG. 10 is a table showing the result of the analysis processing for intermediate data 801 of one page according to the first embodiment;

FIG. 11 is a table showing the data amount of circuit-configuration information of a processing circuit corresponding to the attribute of a pixel in the intermediate data 801 according to the first embodiment;

FIG. 12 is a flowchart showing the procedure of processing of a reconfigurable image processing unit 303 according to the first embodiment;

FIG. 13 is a view illustrating one example of intermediate data of one page according to the second embodiment;

FIG. 14 is a table showing the result of the analysis processing for intermediate data 1301 of one page according to the second embodiment.

DESCRIPTION OF THE EMBODIMENTS

Figure 4:
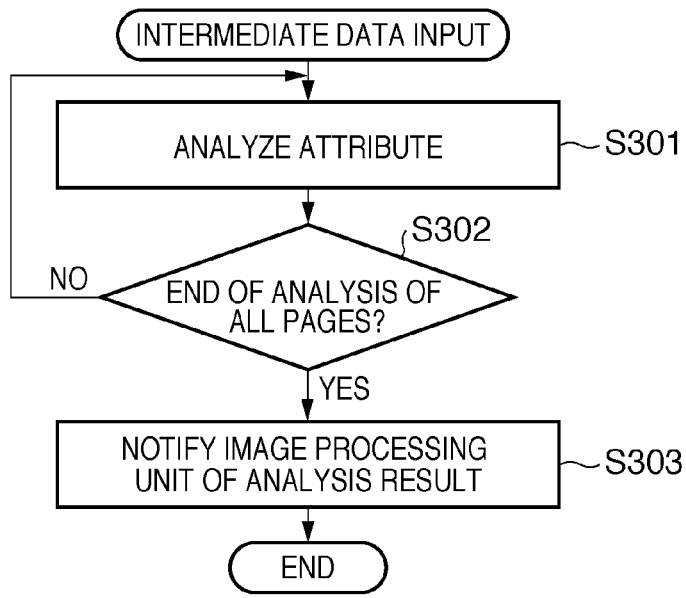
FIG. 4 is a flowchart showing the procedure of processing of an image analysis unit 38 according to the first embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Image Processing System>

The first embodiment will be described below with reference to FIGS. 1 to 11. FIG. 1 is a block diagram illustrating one example of an image processing system 100 according to the first embodiment. The image processing system 100 includes a scanner 1, host computer 2, image processing apparatus 3, storage device 4, and print engine unit 5.

The scanner 1 reads information (for example, images and texts) recorded on a recording medium such as paper, and outputs the reading result as image data. The output image data is input to the image processing apparatus 3. The host computer 2 is a computer such as a general-purpose PC (Personal Computer) or a WS (Work Station). An image or a document created in the host computer 2 is input to the image processing apparatus 3 as PDL data. Although the scanner 1 and the host computer 2 exemplify devices for inputting data to the image processing apparatus 3 in this embodiment, other devices may be adopted. For example, data sent from a multifunction peripheral or a facsimile machine may be input to the image processing apparatus 3.

In this manner, the image processing apparatus 3 can receive the data sent from the scanner 1 and the host computer 2. In other words, the image processing apparatus 3 is connected to the scanner 1 and the host computer 2 so as to perform data communication with them. However, this connection is not particularly limited. Also, the image processing apparatus 3 performs various types of image processing based on the data received from the scanner 1 and the host computer 2 and outputs the data having undergone the image processing. Details of the configuration and processing of the image processing apparatus 3 will be described later. The storage device 4 stores the data that has undergone the image processing, and intermediate data being processed, which are output from the image processing apparatus 3. The print engine unit 5 performs print processing on a storage medium such as paper, based on the data that has undergone the image processing and is output from the image processing apparatus 3.

The configuration of the image processing apparatus 3 will be explained next. The image processing apparatus 3 includes a scanner input processing block 31, host I/F unit 32, PDL processing unit 33, a CPU 34, a RAM 35, a ROM 36, an image processing unit 37, an image analysis unit 38, a storage controller unit 39, and an engine I/F unit 40.

The scanner input processing block 31 receives the image data sent from the scanner 1 and performs various types of color processing for the received image data. The host I/F unit 32 functions as an interface for receiving the PDL data sent from the host computer 2. Note that the host I/F unit 32 differs depending on the network that connects the image processing apparatus 3 and the host computer 2 to each other, and can be, for example, an Ethernet® network, a serial interface network, or a parallel interface network. The PDL processing unit 33 rasterizes the PDL data received by the host I/F unit 32.

The CPU 34 controls the overall image processing apparatus 3 using programs and data stored in the RAM 35 and the ROM 36 and performs respective types of processing (to be described later) by the image processing apparatus 3. The RAM 35 includes not only an area to temporarily store the data received from the scanner 1 and the host computer 2 via the scanner input processing block 31 and the host I/F unit 32, respectively, but also a work area for use in various types of processing by the CPU 34. The ROM 36 stores, for example, programs and data for performing respective types of processing by the CPU 34 and setting data for the image processing apparatus 3.

The image processing unit 37 includes a logic circuit having a reconfigurable logical configuration and performs image processing for images formed from the data sent from the scanner 1 and the host computer 2. Details of the processing of the image processing unit 37 will be described later. The image analysis unit 38 analyzes the image data saved in the storage device 4 and acquires attribute information of each pixel and the distribution of the attribute information. Details of processing of the image analysis unit 38 will be described later.

The storage controller unit 39 controls processing for recording the data, having undergone the image processing by the image processing apparatus 3, in the storage device 4. The engine I/F unit 40 performs a series of processing for sending the data having undergone the image processing by the image processing apparatus 3 to the print engine unit 5. Reference numeral 41 denotes an internal bus of the image processing apparatus 3 that connects the above-mentioned respective units to each other.

<Scanner Input>

Processing of the image processing apparatus 3 when data is sent from the scanner 1 to the image processing apparatus 3 will be explained next with reference to FIG. 2. FIG. 2 is a flowchart showing the procedure of processing when the image processing apparatus 3 receives image data from the scanner 1 according to the first embodiment. The CPU 34 systematically controls the following processing.

When the CPU 34 detects reception of image data sent from the scanner 1 via the scanner input processing block 31, processing according to the flowchart shown in FIG. 2 starts. First, in step S100, the CPU 34 temporarily stores the image data, sent from the scanner 1, in the RAM 35. The process then advances to step S101, in which the CPU 34 performs various types of color processing for the image data. The CPU 34 or a data transfer unit included in the scanner input processing block 31 may perform data transfer between the scanner input processing block 31 and the RAM 35.

In step S101, the CPU 34 generates attribute information of each pixel that forms the image data having undergone the color processing. The generated attribute information includes, for example, texts and photographs in the scanner input. The process then advances to step S102, in which the CPU 34 sends, as intermediate data, the generated attribute information and the image data having undergone the color processing to the storage device 4 via the storage controller unit 39. The intermediate data is saved in the storage device 4 as data of one or more pages in accordance with the image data, sent from the scanner 1, while the image data and the attribute information can be associated with each other for each pixel.

<PDL Input>

Processing of the image processing apparatus 3 when data is sent from the host computer 2 to the image processing apparatus 3 will be explained next with reference to FIG. 3. FIG. 3 is a flowchart showing the procedure of processing when the image processing apparatus 3 receives PDL data from the host computer 2 according to the first embodiment. The CPU 34 systematically controls the following processing.

When the CPU 34 detects reception of PDL data sent from the host computer 2 via the host I/F unit 32, processing according to the flowchart shown in FIG. 3 starts. First, in step S201, the CPU 34 temporarily stores the received PDL data in the RAM 35. The process then advances to step S202, in which the CPU 34 rasterizes the PDL data into a display list into which that data can be rasterized, generates image information of the PDL data and its corresponding attribute information, and stores these pieces of information in a display list. The generated attribute information includes, for example, texts and photographs in the PDL input.

In step S203, the CPU 34 temporarily stores the rasterized display list in the RAM 35. In step S204, the CPU 34 generates intermediate data based on the stored display list. In the intermediate data, image information of the display list and its corresponding attribute information can be associated with each other for each pixel. In step S205, the CPU 34 stores the generated intermediate data in the storage device 4 via the storage controller unit 39. The intermediate data is saved in the storage device 4 as data of one or more pages in accordance with the image data sent from the host computer 2.

<Image Analysis>

Processing of the image analysis unit 38, which analyzes the attributes of the intermediate data saved in the storage device 4, will be explained next with reference to FIG. 4. FIG. 4 is a flowchart showing the procedure of processing of the image analysis unit 38 according to the first embodiment.

First, in step S301, the image analysis unit 38 reads out the intermediate data saved in the storage device 4 to the RAM 35 and analyzes attribute information assigned to the readout intermediate data for each pixel to obtain, for example, the frequency of appearance of each attribute and the order and number of times of switching to each attribute for each page. Details of step S301 will be described later. In step S302, the image analysis unit 38 determines whether all pages have been analyzed. If YES in step S302, the process advances to step S303. If NO in step S302, step S301 is repeated a number of times equal to the number of pages and, after all pages have been analyzed, the process advances to step S303. In step S303, the image analysis unit 38 notifies the image processing unit 37 of the respective information on the frequency of appearance of each attribute and the order and number of times of switching to each attribute, obtained in step S301, and notifies the CPU 34 of the end of the image analysis.

<Print Processing>

Figure 5:
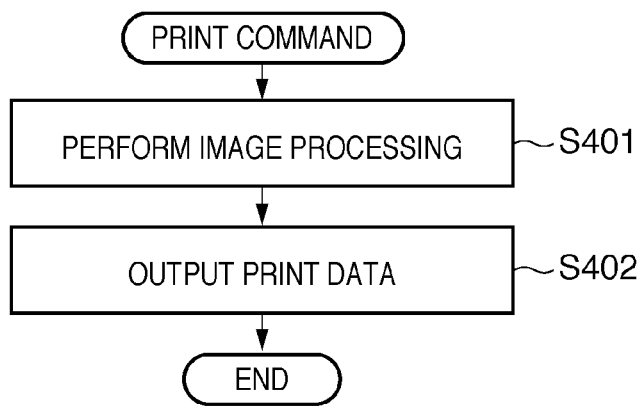
FIG. 5 is a flowchart showing the procedure of print processing according to the first embodiment.

Print processing corresponding to the intermediate data saved in the storage device 4 will be explained next with reference to FIG. 5. FIG. 5 is a flowchart showing the procedure of print processing according to the first embodiment. The CPU 34 systematically controls the following processing.

First, in step S401, in response to the end message sent from the image analysis unit 38, the CPU 34 instructs, as a print command, to read out the intermediate data saved in the storage device 4 from the RAM 35 to the image processing unit 37. After preprocessing of image processing, the image processing unit 37 reads out the intermediate data, performs image processing for print output for the readout data, and converts the processed data into print data. Details of the processing in step S401 will be described later. In step S402, the CPU 34 outputs the converted print data to the print engine unit 5. The print engine unit 5 performs print processing in accordance with the print data.

The image processing apparatus 3 converts data received from both the scanner 1 and the host computer 2 into intermediate data and holds the converted data by the respective types of processing explained with reference to FIGS. 2 to 5. Also, the image processing apparatus 3 performs image processing for the intermediate data and outputs the processing result to the print engine unit 5, thereby performing print processing. Although a case in which intermediate data is temporarily stored in the storage device 4 has been exemplified above, the generated intermediate data may directly undergo image processing, such as tone conversion, without being saved in the storage device 4, and the processing result may be output to the print engine unit 5.

<Intermediate Data>

Figure 6:
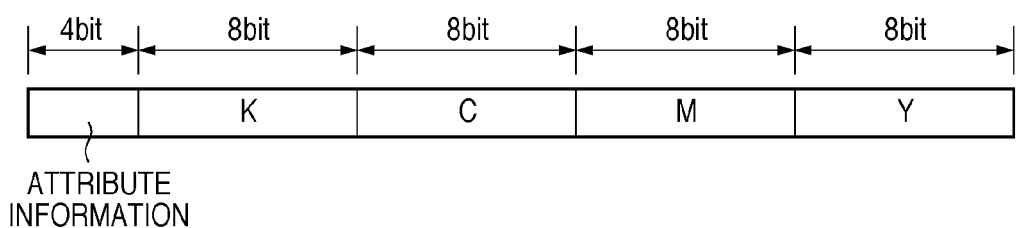
FIG. 6 is a view illustrating one example of the format of intermediate data according to the first embodiment.

The format of the intermediate data will be explained with reference to FIG. 6. FIG. 6 is a view illustrating one example of the format of the intermediate data according to the first embodiment. As described above, the intermediate data contains data and attribute information of each pixel that forms an image. More specifically, the intermediate data contains YMCK data and attribute information of each pixel, as shown in FIG. 6. Although the attribute information has a data length of four bits and the Y, M, C, and K components each have a data length of eight bits in FIG. 6, the present invention is not limited to this. Also, although the color space of pixel data is a YMCK color space in FIG. 6, the present invention is not limited to this, and another color space may be adopted.

<Configuration of Image Processing Unit>

Figure 7:
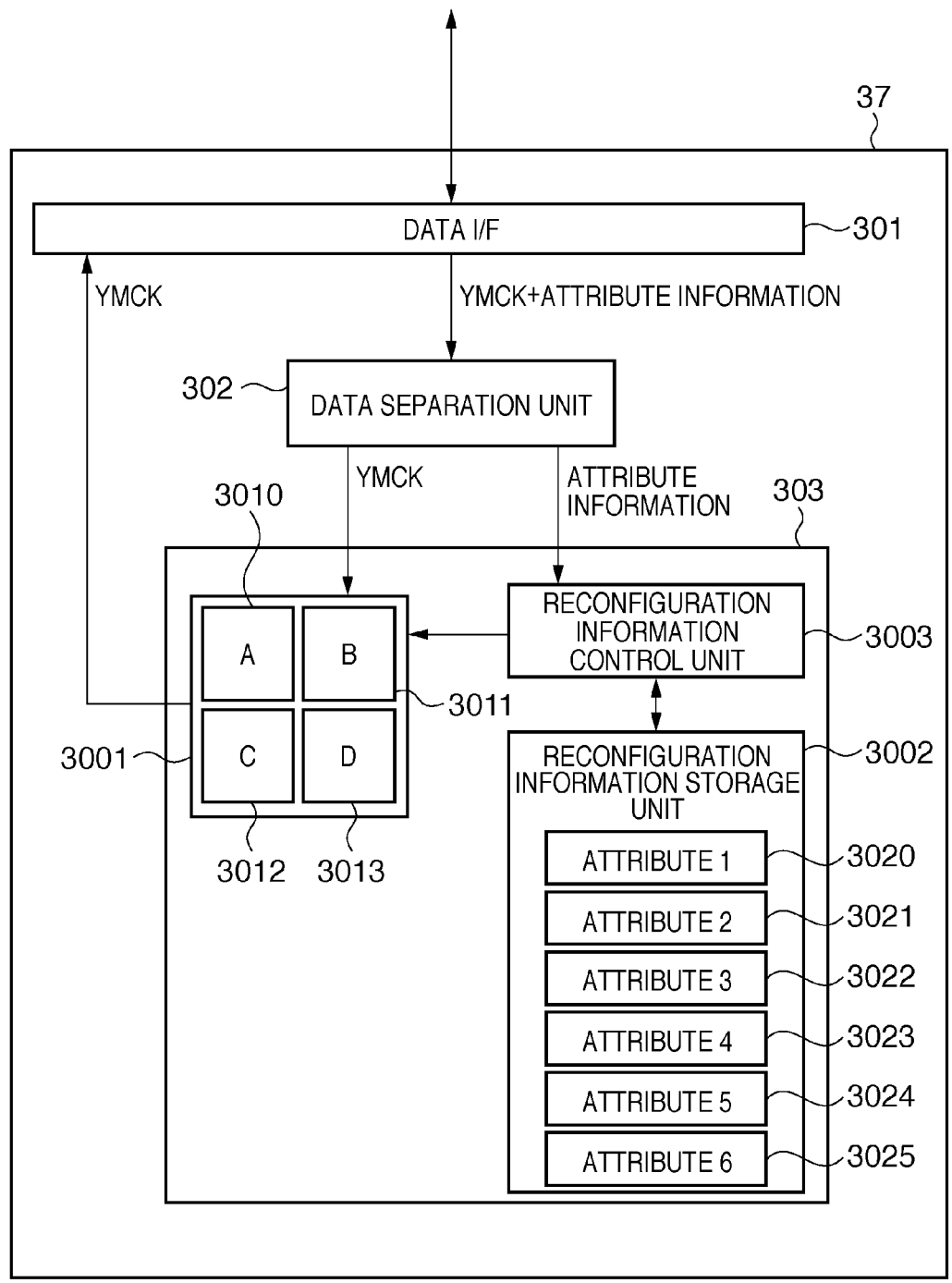
FIG. 7 is a block diagram illustrating an example of the configuration of an image processing unit 37 according to the first embodiment.

The image processing unit 37 will be explained next with reference to FIG. 7. FIG. 7 is a block diagram illustrating an example of the configuration of the image processing unit 37 according to the first embodiment. The image processing unit 37 includes a data I/F 301, data separation unit 302, and reconfigurable image processing unit 303. Also, the reconfigurable image processing unit 303 includes a reconfigurable logic circuit 3001 that has a plurality of circuit configuration planes (circuit configuration units), a reconfiguration information storage unit 3002 that stores circuit reconfiguration information, and a reconfiguration information control unit 3003, which reads out the circuit reconfiguration information and controls a change in circuit configuration. The reconfigurable logic circuit 3001 includes four planes, a plane A 3010, plane B 3011, plane C 3012, and plane D 3013 as the plurality of circuit configuration planes and can perform image processing by enabling one of them. Also, the logic circuit 3001 can change a logical configuration configured on each circuit configuration plane into one of a plurality of types of circuit configurations during circuit operation. Note that the image processing apparatus according to this embodiment uses the plurality of circuit configuration planes by classifying logical configurations to be configured into the one to be configured on a fixed circuit configuration plane and the one to be configured on a reconfigurable circuit configuration plane.

The intermediate data input to the image processing unit 37 is separated into pixel data and attribute information in the data separation unit 302. The separated attribute information is input to the reconfiguration information control unit 3003. The reconfiguration information control unit 3003 designates a circuit configuration plane to be enabled in the reconfigurable logic circuit 3001 in accordance with the attribute information. On the other hand, the separated pixel data is input to the reconfigurable logic circuit 3001. Then, the image processing is performed using the logical configuration configured on the previously designated circuit configuration plane. If a desired circuit is configured on none of the circuit configuration planes A to D of the reconfigurable logic circuit 3001, desired reconfiguration information is read from the reconfiguration information storage unit 3002 to one circuit configuration plane of the reconfigurable logic circuit 3001, and image processing is performed after the readout.

<Operations of Image Analysis Unit/Image Processing Unit>

Figure 8:
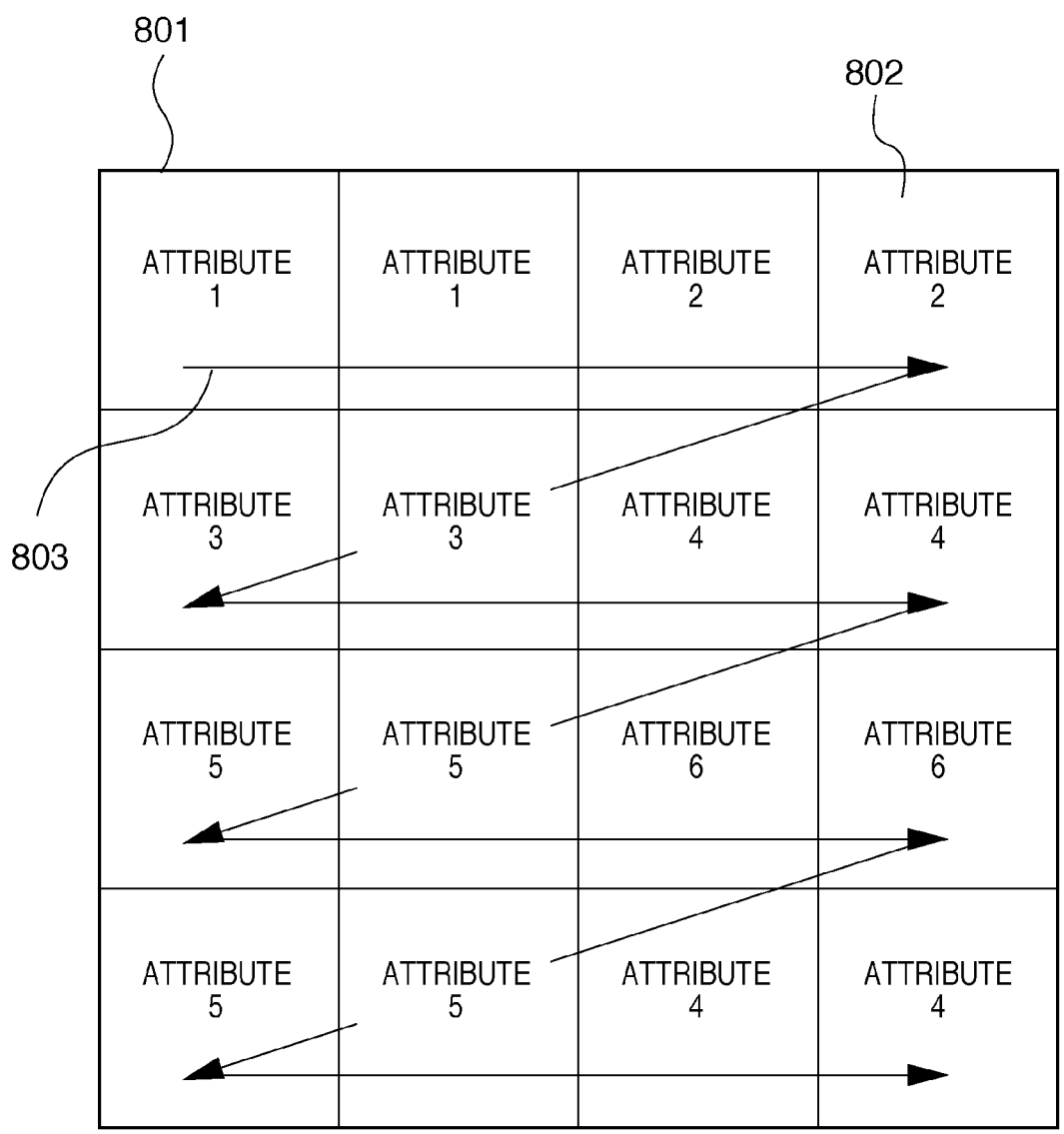
FIG. 8 is a view illustrating one example of intermediate data of one page according to the first embodiment.

The operations of the image analysis unit 38 and the image processing unit 37 will be explained next with reference to FIGS. 8 to 12. FIG. 8 is a view illustrating one example of intermediate data of one page according to the first embodiment. Intermediate data 801 of one page is formed from a total of 16 pixels, four pixel rows×four pixel columns, as shown in FIG. 8. Each pixel has a format containing pixel data and attribute information, as explained with reference to FIG. 6. For example, a pixel denoted by reference numeral 802 contains pixel data and attribute information indicating attribute 2.

Figure 9:
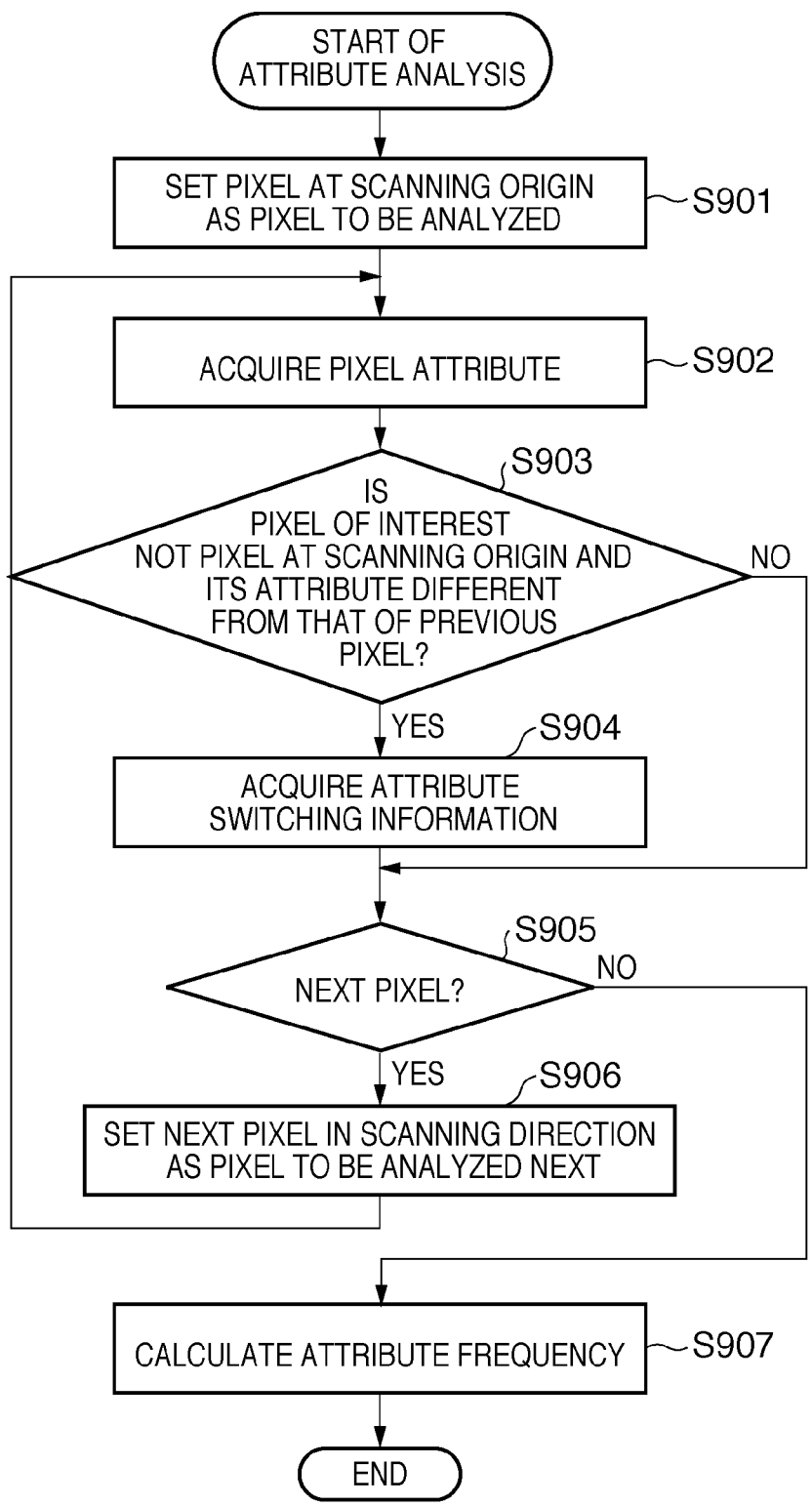
FIG. 9 is a flowchart showing the procedure of image-analysis processing according to the first embodiment.

Image-analysis processing of the image analysis unit 38 for the intermediate data 801 will be explained with reference to FIG. 9. FIG. 9 is a flowchart showing the procedure of image-analysis processing according to the first embodiment. The following flowchart corresponds to the detailed processing in step S301 in FIG. 4.

First, in step S901, the image analysis unit 38 sets, as the first pixel to be analyzed, a pixel positioned at the scanning origin of image data to be analyzed. A pixel to be analyzed will be referred to as a pixel of interest hereinafter. For example, a pixel positioned in the first pixel row and the first pixel column with respect to the upper left vertex of the intermediate data 801 is set as the first pixel of interest. This pixel of interest is set in accordance with a predetermined order when image processing is performed in the predetermined order.

In step S902, the image analysis unit 38 decodes and acquires attribute information of the pixel of interest. Attribute 1 (for example, a first attribute or a second attribute), for example, is acquired as the attribute of the pixel positioned in the first pixel row and the first pixel column of the intermediate data 801. In step S903, the image analysis unit 38 determines whether the attribute information of the pixel of interest does not indicate the pixel at the scanning origin and its attribute acquired in step S902 is different from that of the previous pixel. The previous pixel means herein a pixel of interest preceding the current pixel of interest in the analysis processing. If YES is determined in step S903, the process advances to step S904, in which the image analysis unit 38 acquires attribute switching information indicating switching of the attribute information from the previous one to the current one, and the process advances to step S905. In contrast, if NO is determined in step S903, the process directly advances to step S905. If, for example, the previously analyzed pixel is positioned at the scanning origin, NO is determined in step S903, and the process advances to step S905.

In step S905, the image analysis unit 38 determines whether a pixel to be analyzed next remains. If YES is determined in step S905, the process advances to step S906, in which the image analysis unit 38 sets, as the next pixel of interest, a pixel positioned next in the scanning direction, and the process returns to step S902. If, for example, the current pixel of interest is positioned at the scanning origin, the pixel positioned in the first pixel row and the second pixel column with respect to the upper left vertex of the intermediate data 801 is set as the next pixel of interest, and the process returns to step S902, in which the above-mentioned processing continues.

In contrast, if NO is determined in step S905, the attribute acquisition for the intermediate data ends, and the process advances to step S907. In step S907, using the total numbers of respective attributes of the acquired intermediate data and the total pixel count of the intermediate data, the image analysis unit 38 divides the number of appearances of the acquired attribute by the total pixel count to calculate the attribute frequency for each attribute. The total pixel count is acquired from the header information of the intermediate data. Attribute 1, for example, has a frequency of 13% because the total number of appearances of attribute 1 is two and the total pixel count is 16 in this case.

FIG. 10 is a table showing the result of the analysis process for the intermediate data 801 of one page according to the first embodiment. The analysis result shown in FIG. 10 indicates the contents derived by analyzing the intermediate data 801 by the image analysis unit 38. The column of an attribute type 1001 indicates the types of attributes acquired in the intermediate data of one page. In this case, six types of attributes 1 to 6 (for example, that include a first attribute and a second attribute) are acquired. The column of the number of appearances 1002 indicates the numbers of respective attributes acquired in the intermediate data of one page. In this case, the numbers of acquired attributes 1, 2, 3, and 6 are two each, and those of acquired attributes 4 and 5 are four each. The column of a frequency of appearance 1003 indicates the frequencies of appearance of the respective attributes acquired in the intermediate data of one page. The frequency of appearance is the percentage of the number of appearances 1002 to the total pixel count of 16. In this case, the frequencies of appearance of attributes 1, 2, 3, and 6 are 13% each, and those of attributes 4 and 5 are 25% each. The column of attribute switching 1004 indicates the order in which the attribute is switched from one to another in the scanning sequence in the intermediate data of one page. In this case, one and larger values indicate the order of switching. Zero value indicates that switching of the attribute to the one having zero value did not take place, and the attribute of the pixel at the scanning origin has zero value. More specifically, in attribute analysis of the intermediate data 801 in the scanning sequence, the first pixel switching takes place from the pixel that is positioned in the first pixel row and the second pixel column and has attribute 1 to the one that is positioned in the first pixel row and the third pixel column and has attribute 2. In the attribute analysis of the intermediate data 801, because switching of the attribute to attribute 2 takes place only once, attribute 2 has an attribute switching value 1005 of 1. Also, because switching of the attribute to attribute 3 takes place only once in the second pixel switching, attribute 3 has an attribute switching value 1005 of 2. Moreover, switching of the attribute to attribute 4 takes place twice in the third pixel switching to the pixel that is positioned in the second pixel row and the third pixel column and has attribute 4 and in the seventh pixel switching to the pixel that is positioned in the fourth pixel row and the third pixel column, attribute 4 has attribute switching values 1005 of 3 and 7. In other words, the attribute switching value indicates the order in which switching of the attribute takes place. The attribute switching values of other attributes are determined in the same way. If the intermediate data stored in the storage device 4 has a plurality of pages, the above-mentioned analysis result is generated for each page in accordance with the process sequence shown in FIG. 4.

Detailed processing of the reconfigurable image processing unit 303 in the image processing unit 37 for the intermediate data 801 will be explained next with reference to FIGS. 11 and 12. FIG. 11 is a table showing the data amount of circuit-configuration information of a processing circuit corresponding to the attribute of a pixel in the intermediate data 801 according to the first embodiment. The column of an attribute type 1101 indicates the types of attributes stored in the reconfiguration information storage unit 3002. In this case, six types of attributes, attributes 1 to 6 are present. The column of a reconfiguration information data amount 1102 indicates the data amount of circuit reconfiguration information corresponding to each attribute (unit: KB (kilobyte)).

Although various types of attributes are applicable, attribute 1 is assumed as, for example, a text attribute herein. In this case, when a circuit configuration plane is reconfigured based on circuit reconfiguration information corresponding to a text attribute, the reconfigured circuit configuration plane can perform image processing suited to the text attribute upon receiving a pixel having the text attribute. Also, attribute 2 is assumed as a halftone attribute, attribute 3 is assumed as a photograph attribute, attribute 4 is assumed as a graphic attribute, attribute 5 is assumed as a foundation attribute, and attribute 6 is assumed as a table attribute. By reconfiguring a circuit configuration plane (one or two types of circuit configurations) based on circuit reconfiguration information corresponding to each attribute, the reconfigured circuit configuration plane can perform image processing suited to each attribute upon receiving a pixel having each attribute.

In this case, the numbers of times of switching from attributes 1, 2, 3, and 6 to other attributes are one each, and those of switching from attributes 4 and 5 to other attributes are two each.

FIG. 12 is a flowchart showing the procedure of processing of the reconfigurable image processing unit 303 according to the first embodiment. The following flowchart corresponds to the detailed processing in step S401 of FIG. 3.

First, in step S1201, the image processing unit 303 calculates a circuit-switching time period that allows reconfiguration in accordance with the data amount of the circuit-configuration information shown in FIG. 11. In this case, the circuit-switching time period is proportional to the data amount of the circuit-configuration information. Hence, the circuit-switching time periods for attributes 1 to 6 are 10t, 15t, 20t, 10t, 5t, and 10t, respectively, where t is an arbitrary unit time.

In step S1202, the image processing unit 303 determines, circuit information fixed on a circuit configuration plane (first type circuit configuration) of the reconfigurable logic circuit 3001, based on the analysis result acquired from the image analysis unit 38 and the above-mentioned circuit-switching time periods. As a determination method, the circuit-switching time period for each attribute is multiplied by the number of times of switching to each attribute to calculate the total switching time period for each attribute, and attributes are extracted in descending order of total switching time period a number of times equal to a predetermined number of fixed planes. More specifically, the total switching time periods for attributes 1 to 6 are 0, 15t, 20t, 20t, 10t, and 10t, respectively. As a result, when predetermined fixed planes are determined as the circuit configuration plane A 3010 and circuit configuration plane B 3011, attributes 3 and 4 for which the total switching time periods are long are determined to be fixed on the circuit configuration planes.

In step S1203, the image processing unit 303 initializes the circuit configuration planes of the reconfigurable logic circuit 3001. Circuit-configuration information corresponding to the attribute to be fixed, determined in step S1202, is loaded to the fixed plane, and that corresponding to an attribute containing a small value of the attribute switching 1004 is loaded to the remaining circuit configuration plane. More specifically, pieces of circuit-configuration information corresponding to attributes 3 and 4 are loaded to the plane A 3010 and plane B 3011 as pieces of circuit-configuration information to be fixed. On the other hand, pieces of circuit-configuration information corresponding to attributes 1 and 2 are loaded to the plane C 3012 and plane D 3013. Hence, a circuit having attribute 3 is configured on the plane A 3010, one having attribute 4 is configured on the plane B 3011, one having attribute 1 is configured on the plane C 3012, and one having attribute 2 is configured on the plane D 3013 after the initialization.

In step S1204, the image processing unit 303 starts to receive the intermediate data stored in the storage device 4. In step S1205, the reconfiguration information control unit 3003 analyzes the received attribute information to acquire the received attribute of each pixel. In step S1206, the image processing unit 303 determines whether a processing circuit corresponding to the received attribute is present on a circuit configuration plane.

If YES is determined in step S1206, the process directly advances to step S1208, in which the image processing unit 303 performs desired image processing, and the process advances to step S1209. In contrast, if NO is determined in step S1206, the process advances to step S1207, in which the image processing unit 303 performs circuit configuration switching. Since data cannot be received during the circuit configuration switching, the reconfiguration information control unit 3003 stops the data input to the data I/F 301 by instructing it to assert a data input stop signal, and then loads desired circuit-configuration information from the reconfiguration information storage unit 3002. Note that as the switching target, a circuit configuration plane on which is configured a logical configuration that is least likely to be required again is selected from reconfigurable logical configurations that are currently configured on the circuit configuration planes. More specifically, the first circuit switching takes place in the intermediate data 801 shown in FIG. 8 when the pixel that is positioned in the third pixel row and the first pixel column and has attribute 5 is processed. Also, since the switchable planes are the plane C 3012 and plane D 3013 and neither of the attributes of the circuits configured on these planes is switched until the process ends, the plane C 3012 is assumed as the plane to be switched. After the processing in step S1207 is completed, the process advances to step S1208, in which the image processing unit 303 performs desired image processing, and the process advances to step S1209.

In step S1209, the image processing unit 303 determines whether the currently processed pixel is the last pixel that forms the intermediate data. If YES is determined in step S1209, the image processing ends, and the CPU 34 is notified of the end of the image processing. In contrast, if NO is determined in step S1209, the process returns to step S1205, in which the image processing unit 303 performs image processing in accordance with the above-mentioned procedure.

As described above, when the intermediate data 801 is processed, circuit switching takes place twice: when the pixel that is positioned in the third pixel row and the first pixel column and has attribute 5 is processed, and when the pixel that is positioned in the third pixel row and the third pixel column and has attribute 6 is processed. Hence, the total switching time period is 5t+10t=15t. In contrast, a case in which the intermediate data 801 is processed by prioritizing only the frequency of appearance of each attribute will be explained below.

In this case, attributes corresponding to pieces of circuit information to be fixed are attributes 4 and 5, and those corresponding to pieces of circuit information of circuits to be configured on the remaining circuits are attributes 1 and 2. Then, circuit switching takes place twice: when the pixel that is positioned in the second pixel row and the first pixel column and has attribute 3 is processed, and when the pixel that is positioned in the third pixel row and the third pixel column and has attribute 6 is processed. Hence, the total switching time period is 20t+10t=30t. In this manner, according to this embodiment, it is possible to reduce both the overhead incurred in the circuit-switching time period and the data processing time.

As has been explained above, an image processing apparatus according to this embodiment includes a logic circuit that has a plurality of circuit configuration planes with logical configurations that can be reconfigured in operation, and a storage unit that stores in advance the switching time period for which switching to each logical configuration is performed, and reconfigures the logic circuit in accordance with image processing to be performed. Also, the image processing apparatus analyzes the attribute of each pixel contained in image data processed in a predetermined order in the logic circuit, and derives the frequency of appearance of each attribute and the order and number of times of switching to each attribute in the predetermined order for each analyzed attribute. Moreover, the image processing apparatus multiplies the switching time period by the number of times of switching for each attribute to calculate the total switching time period for each attribute when processing is performed in the predetermined order. Using the total switching time period, the image processing apparatus determines a logical configuration to be configured on each circuit configuration plane in advance before image processing starts, determines a fixed circuit configuration plane and a reconfigurable circuit configuration plane, and switches the logical configuration in accordance with image processing to be performed. Note that the image processing apparatus determines a logical configuration on a fixed circuit configuration plane by selecting attributes in descending order of total switching time period and determining logical configurations for image processing corresponding to the attributes. In this manner, the image processing apparatus analyzes the attribute of each pixel in image data serving as an image processing target to calculate a total switching time period that takes account of the frequency of appearance of each attribute and the order and number of times of switching to each attribute, and determines a logical configuration configured on a fixed circuit configuration plane. In other words, the image processing apparatus can perform processing within a switching time period minimum for image data processed in a predetermined order.

The present invention is not limited to the above-described embodiment and can be modified into various forms. For example, the image processing apparatus switches a logical configuration configured on a reconfigurable circuit configuration plane in accordance with image processing by selecting, as a switching target, a circuit configuration plane on which a logical configuration that is least likely to be required again is configured. With this operation, the image processing apparatus can reduce the number of times of switching of the logical configuration as much as possible during processing of the image data and, in turn, reduce the overhead required for the switching.

An image processing apparatus that performs image processing for image data has been exemplified in the above-described embodiment. However, the present invention is also applicable to an information processing apparatus that processes data. In this case, the information processing apparatus can be realized by analyzing the attribute of processed data per predetermined unit instead of analyzing the attribute of processed image data per unit pixel.

Second Embodiment

Figure 15:
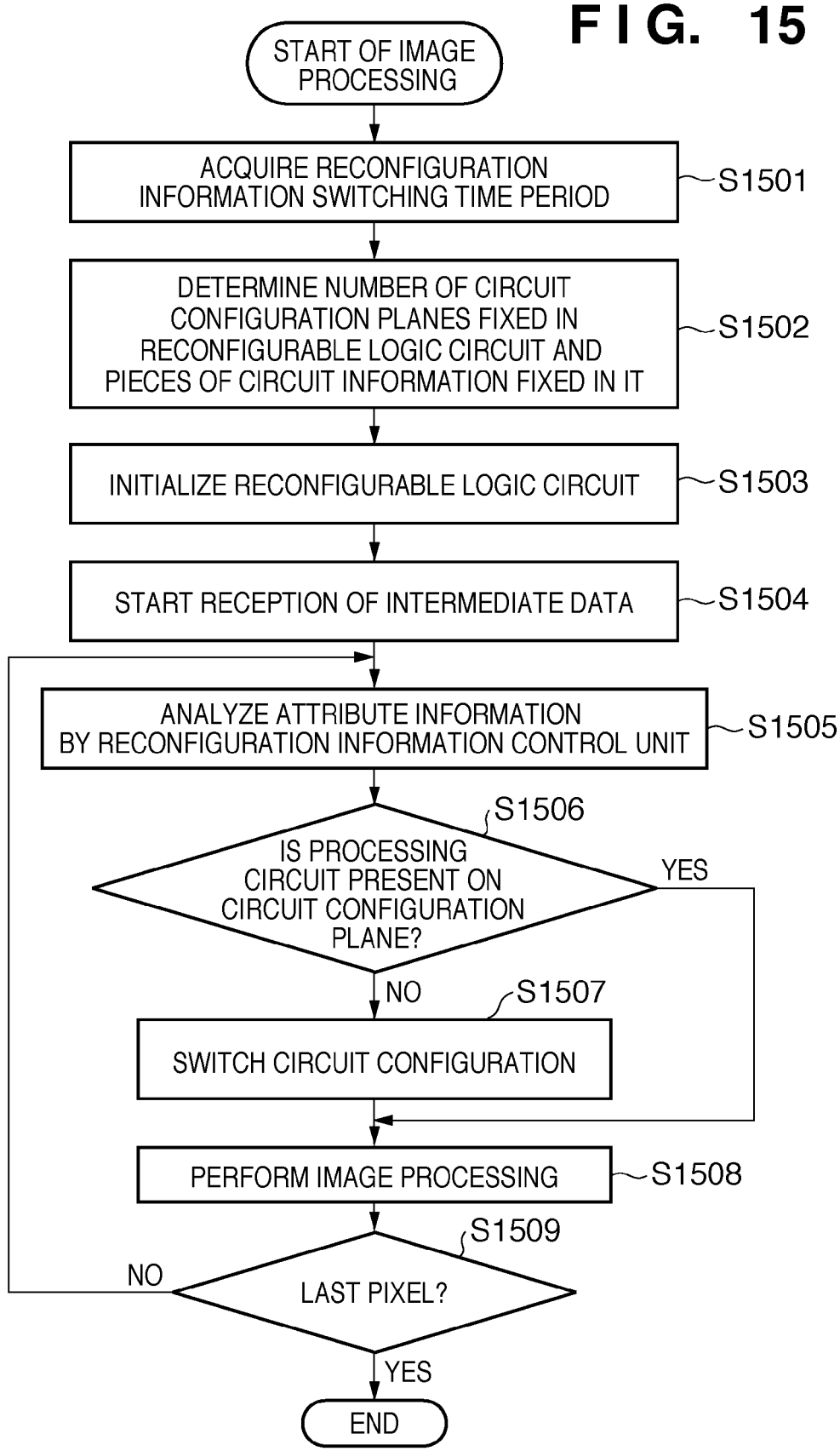
FIG. 15 is a flowchart showing the procedure of processing of a reconfigurable image processing unit 303 according to the second embodiment.

The second embodiment will be described below with reference to FIGS. 13 to 15. The second embodiment is characterized by suitably determining the number of fixed planes in the reconfigurable logic circuit 3001 to reduce the switching time period required for circuit reconfiguration in the processing of the reconfigurable image processing unit 303 in the above-described first embodiment. Note that the same configurations and techniques as in the first embodiment will not be explained.

FIG. 13 is a view illustrating one example of intermediate data of one page according to the second embodiment. Intermediate data 1301 of one page shown in FIG. 13 is formed from a total of 20 pixels, five pixel rows×four pixel columns. Each pixel has a format containing pixel data and attribute information, as explained with reference to FIG. 6. For example, a pixel denoted by reference numeral 1302 contains pixel data and attribute information indicating attribute 1. Note that the data amount of circuit reconfiguration information corresponding to each attribute is the same as in that shown in FIG. 11.

FIG. 14 is a table showing the result of the analysis processing for the intermediate data 1301 of one page according to the second embodiment. The column of an attribute type 1401 indicates the types of attributes acquired in the intermediate data of one page. In this case, six types of attributes 1 to 6 are acquired. The column of the number of appearances 1402 indicates the numbers of respective attributes acquired in the intermediate data of one page. In this case, the number of acquired attributes 1 is eight, that of acquired attributes 2 is four, and those of acquired attributes 3, 4, 5, and 6 are two each. The column of a frequency of appearance 1403 indicates the frequencies of appearance of the respective attributes acquired in the intermediate data of one page. The frequency of appearance is the percentage of the number of appearances 1402 to a total pixel count of 20. In this case, the frequency of appearance of attribute 1 is 40%, that of attribute 2 is 20%, and those of attributes 3, 4, 5, and 6 are 10% each. The column of attribute switching 1404 indicates the order in which the attribute is switched from one to another in the scanning sequence in the intermediate data of one page. In this case, one and larger values indicate the order of switching. Zero value indicates that switching of the attribute to the one having zero value did not take place, and the attribute of the pixel at the scanning origin includes zero value. More specifically, in attribute analysis of the intermediate data 1301 in the scanning sequence, the first pixel switching takes place from the pixel that is positioned in the first pixel row and the fourth pixel column and has attribute 1 to the one that is positioned in the second pixel row and the first pixel column and has attribute 2. Switching of the attribute to attribute 2 in the attribute analysis of the intermediate data 1301 takes place in the following three cases. First, the sixth switching takes place from the pixel that is positioned in the third pixel row and the second pixel column and has attribute 1 to the one that is positioned in the third pixel row and the third pixel column and has attribute 2. Second, the tenth switching takes place from the pixel that is positioned in the fourth pixel row and the second pixel column and has attribute 3 to the one that is positioned in the fourth pixel row and the third pixel column and has attribute 2. Third, the 12th switching takes place from the pixel that is positioned in the fourth pixel row and the fourth pixel column and has attribute 4 to the one that is positioned in the fifth pixel row and the first pixel column and has attribute 2. Hence, attribute 2 has attribute switching values 1405 of 1, 6, 10, and 12. The attribute switching values of other attributes are determining in the same way.

Processing of a reconfigurable image processing unit 303 for the intermediate data 1301 will be explained next with reference to FIG. 15. FIG. 15 is a flowchart showing the procedure of processing of the reconfigurable image processing unit 303 according to the second embodiment. The following flowchart corresponds to the detailed processing in step S401 of FIG. 3.

First, in step S1501, the image processing unit 303 calculates a circuit-switching time period that allows reconfiguration in accordance with the data amount of the circuit-configuration information shown in FIG. 11. In this case, the circuit-switching time period is proportional to the data amount of the circuit-configuration information. Hence, the circuit-switching time periods for attributes 1 to 6 are 10t, 15t, 20t, 10t, 5t, and 10t, respectively, where t is an arbitrary unit time.

In step S1502, the image processing unit 303 determines the number of circuit configuration planes fixed in a reconfigurable logic circuit 3001 and pieces of circuit information fixed in it, based on the analysis result acquired from an image analysis unit 38 and the above-mentioned circuit-switching time periods. As a determination method, first, a total switching time period is calculated for each attribute by multiplying the circuit-switching time period for each attribute by the number of times of switching to each attribute. Next, attributes are extracted in descending order of the total switching time period a number of times equal to 0 or 1 to N−1 fixed planes, and determined to be fixed. Note that N is the number of circuit configuration planes of the reconfigurable logic circuit 3001. Lastly, a total switching time period is calculated for each number of fixed planes, and the number of fixed planes, in which the total switching time period is minimized, is determined.

More specifically, first, the total switching time periods for attributes 1 to 6 in the intermediate data 1301 are 30t, 60t, 40t, 30t, 15t, and 20t, respectively. Next, the total switching time periods when the number of fixed planes is 0, 1, 2, and 3 will be explained. In the following description, assume that circuits set on circuit configuration planes in advance before the start of processing correspond to attributes 1, 2, 3, and 4 to be processed in the scanning sequence. Assume also that a circuit configuration plane to be switched during circuit switching is other than the fixed plane and has a circuit that is configured on it and corresponds to an attribute that is least likely to be selected again.

A case in which the number of fixed planes is zero, for example, all planes are not locked will be explained first. The first pixel switching takes place from the pixel that is positioned in the second pixel row and the third pixel column and has attribute 4 to the one that is positioned in the second pixel row and the fourth pixel column and has attribute 5. Then, a circuit corresponding to attribute 5 is set on a circuit configuration plane, for which circuit information corresponding to attribute 1 is set, for a time period 5t. The second pixel switching takes place from the pixel that is positioned in the second pixel row and the fourth pixel column and has attribute 5 to the one that is positioned in the third pixel row and the first pixel column and has attribute 1. A circuit corresponding to attribute 1 is set on a circuit configuration plane, for which circuit information corresponding to attribute 2 is set, for a time period 10t. The third pixel switching takes place from the pixel that is positioned in the third pixel row and the second pixel column and has attribute 1 to the one that is positioned in the third pixel row and the third pixel column and has attribute 2. A circuit corresponding to attribute 2 is set on a circuit configuration plane, for which circuit information corresponding to attribute 3 is set, for a time period 15t. The fourth pixel switching takes place from the pixel that is positioned in the third pixel row and the third pixel column and has attribute 2 to the one that is positioned in the third pixel row and the fourth pixel column and has attribute 6. A circuit corresponding to attribute 6 is set on a circuit configuration plane, for which circuit information corresponding to attribute 4 is set, for a time period 10t. The fifth pixel switching takes place from the pixel that is positioned in the fourth pixel row and the third pixel column and has attribute 2 to the one that is positioned in the fourth pixel row and the fourth pixel column and has attribute 4. A circuit corresponding to attribute 4 is set on a circuit configuration plane, for which circuit information corresponding to attribute 1 is set, for a time period 10t. The sixth pixel switching takes place from the pixel that is positioned in the fourth pixel row and the fourth pixel column and has attribute 4 to the one that is positioned in the fifth pixel row and the first pixel column and has attribute 2. A circuit corresponding to attribute 2 is set on a circuit configuration plane, for which circuit information corresponding to attribute 1 is set, for a time period 15t. The seventh pixel switching takes place from the pixel that is positioned in the fifth pixel row and the first pixel column and has attribute 2 to the one that is positioned in the fifth pixel row and the second pixel column and has attribute 5. A circuit corresponding to attribute 5 is set on a circuit configuration plane, for which circuit information corresponding to attribute 6 is set, for a time period 5t. The eighth pixel switching takes place from the pixel that is positioned in the fifth pixel row and the second pixel column and has attribute 5 to the one that is positioned in the fifth pixel row and the third pixel column and has attribute 1. A circuit corresponding to attribute 1 is set on a circuit configuration plane, for which circuit information corresponding to attribute 3 is set, for a time period 10t. The ninth pixel switching takes place from the pixel that is positioned in the fifth pixel row and the third pixel column and has attribute 1 to the one that is positioned in the fifth pixel row and the fourth pixel column and has attribute 6. A circuit corresponding to attribute 6 is set on a circuit configuration plane, for which circuit information corresponding to attribute 2 is set, for a time period 10t. Hence, the total switching time period when the number of fixed planes is zero is 5t+10t+15t+10t+10t+15t+5t+10t+10t=90t.

A case in which the number of fixed planes is one will be explained next. Note that a circuit corresponding to attribute 2, for which the previously calculated total switching time period is longest, 60t is fixed. The first pixel switching takes place from the pixel that is positioned in the second pixel row and the third pixel column and has attribute 4 to the one that is positioned in the second pixel row and the fourth pixel column and has attribute 5. Then, a circuit corresponding to attribute 5 is set on a circuit configuration plane, for which circuit information corresponding to attribute 1 is set, for a time period 5t. The second pixel switching takes place from the pixel that is positioned in the second pixel row and the fourth pixel column and has attribute 5 to the one that is positioned in the third pixel row and the first pixel column and has attribute 1. A circuit corresponding to attribute 1 is set on a circuit configuration plane, for which circuit information corresponding to attribute 3 is set, for a time period 10t. The third pixel switching takes place from the pixel that is positioned in the third pixel row and the fourth pixel column and has attribute 6 to the one that is positioned in the fourth pixel row and the first pixel column and has attribute 1. A circuit corresponding to attribute 6 is set on a circuit configuration plane, for which circuit information corresponding to attribute 4 is set, for a time period 10t. The fourth pixel switching takes place from the pixel that is positioned in the fourth pixel row and the first pixel column and has attribute 1 to the one that is positioned in the fourth pixel row and the second pixel column and has attribute 3. A circuit corresponding to attribute 3 is set on a circuit configuration plane, for which circuit information corresponding to attribute 5 is set, for a time period 20t. The fifth pixel switching takes place from the pixel that is positioned in the fourth pixel row and the third pixel column and has attribute 2 to the one that is positioned in the fourth pixel row and the fourth pixel column and has attribute 4. A circuit corresponding to attribute 4 is set on a circuit configuration plane, for which circuit information corresponding to attribute 6 is set, for a time period 10t. The sixth pixel switching takes place from the pixel that is positioned in the fifth pixel row and the first pixel column and has attribute 2 to the one that is positioned in the fifth pixel row and the second pixel column and has attribute 5. A circuit corresponding to attribute 5 is set on a circuit configuration plane, for which circuit information corresponding to attribute 1 is set, for a time period 5t. The seventh pixel switching takes place from the pixel that is positioned in the fifth pixel row and the second pixel column and has attribute 5 to the one that is positioned in the fifth pixel row and the third pixel column and has attribute 1. A circuit corresponding to attribute 1 is set on a circuit configuration plane, for which circuit information corresponding to attribute 3 is set, for a time period 10t. The eighth pixel switching takes place from the pixel that is positioned in the fifth pixel row and the third pixel column and has attribute 1 to the one that is positioned in the fifth pixel row and the fourth pixel column and has attribute 6. A circuit corresponding to attribute 6 is set on a circuit configuration plane, for which circuit information corresponding to attribute 4 is set, for a time period 10t. Hence, the total switching time period when the number of fixed planes is one is 5t+10t+10t+20t+10t+5t+10t+10t=80t.

In the same way, when the number of fixed planes is two, circuits corresponding to attributes 2 and 3 are fixed and the total switching time period is 50t. When the number of circuit configuration planes is three, attributes 2 and 3 and attribute 1, with a frequency of appearance higher than that of attribute 4 is fixed of attributes 1 and 4 for which the total switching time periods are both third longest, are fixed and the total switching time period is 40t. Hence, in step S1502, the image processing unit 303 determines the number of fixed planes as three and determines attributes 1, 2, and 3 to be fixed on circuit configuration planes so that the image processing time is minimized.

In step S1503, the image processing unit 303 initializes the circuit configuration planes of the reconfigurable logic circuit 3001. Circuit-configuration information corresponding to the attribute to be fixed, determined in step S1502, is loaded to the fixed plane, and that corresponding to an attribute containing a small value of the attribute switching 1404 is loaded to the remaining circuit configuration plane. More specifically, three planes, a circuit configuration plane A 3010, circuit configuration plane B 3011, and circuit configuration plane C 3012 are set as fixed planes, and pieces of circuit-configuration information corresponding to attributes 1, 2, and 3 are loaded to the respective planes. On the other hand, circuit-configuration information corresponding to attribute 4 is loaded to a circuit configuration plane D 3013. Hence, a circuit having attribute 1 is configured on the plane A 3010, one having attribute 2 is configured on the plane B 3011, one having attribute 3 is configured on the plane C 3012, and one having attribute 4 is configured on the plane D 3013 after the initialization.

In step S1504, the image processing unit 303 starts to receive the intermediate data stored in a storage device 4, and the process advances to step S1505. In step S1505, a reconfiguration information control unit 3003 analyzes the received attribute information to acquire the received attribute of each pixel. In step S1506, the image processing unit 303 determines whether a processing circuit corresponding to the received attribute is present on a circuit configuration plane. If YES is determined in step S1506, the process directly advances to step S1508, in which the image processing unit 303 performs desired image processing, and the process advances to step S1509. In contrast, if NO is determined in step S1506, the process advances to step S1507, in which the image processing unit 303 performs circuit configuration switching. Since data cannot be received during the circuit configuration switching, the reconfiguration information control unit 3003 stops the data input to a data I/F 301 by instructing it to assert a data input stop signal, and then loads desired circuit-configuration information from a reconfiguration information storage unit 3002. Note that a circuit configuration plane to be switched is other than the fixed plane and has a circuit that is configured on it and corresponds to an attribute that is least likely to be selected again. More specifically, the first circuit switching takes place in the intermediate data 1301 when the pixel that is positioned in the second pixel row and the fourth pixel column and has attribute 5 is processed. Also, the switchable plane is the plane D 3013. After that, the process advances to step S1508, in which the image processing unit 303 performs desired image processing, and the process advances to step S1509.

In step S1509, the image processing unit 303 determines whether the currently processed pixel is the last pixel that forms the intermediate data. If YES is determined in step S1509, the image processing ends, and a CPU 34 is notified of the end of the image processing. In contrast, if NO is determined in step S1509, the process returns to step S1505, in which the image processing unit 303 performs image processing in accordance with the above-mentioned procedure.

As described above, when the intermediate data 1301 is processed, the number of fixed planes is suitably determined as three and the total switching time period is 40t. As a result, the determined number of fixed planes can more greatly reduce both the overhead incurred in the circuit-switching time period and the data processing time than any other number of fixed planes.

As has been explained above, an image processing apparatus according to this embodiment determines the number of fixed circuit configuration planes based on the total switching time period, in addition to the configuration and operation in the first embodiment. With this operation, the image processing apparatus can perform image processing by setting a more optimal switching time period. Note that the first and second embodiments can be modified into various forms. For example, the number of fixed planes determined in advance in the first embodiment is not limited to two, and can be changed as needed in accordance with the circuit configuration planes adopted. Also, the number of circuit configuration planes of the reconfigurable logic circuit is not limited to four as exemplified in each embodiment, and can be changed as needed. Moreover, the numbers of pixel rows and columns and the total pixel count, for example, in the intermediate data are not limited to those exemplified in each embodiment, and can be changed as needed in accordance with the data input from the scanner 1 and host computer 2. The detailed configuration and detailed operation of each unit, which constitutes the image processing apparatus in each embodiment, can also be changed as needed without departing from the scope of the present invention.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-108459 filed on Apr. 27, 2009, which is hereby incorporated by reference herein in its entirety.

What is claimed is:

1. An image processing apparatus comprising:
a plurality of image processing units that have variable circuit configurations;
an input unit that inputs image data;
a first acquisition unit that acquires, for each attribute of a plurality of pixels, a number of times of switching to a circuit configuration corresponding to the attribute of the pixels when image processing is executed for the image data while dynamically changing the circuit configuration of the image processing unit;
a second acquisition unit that acquires, for each attribute of the pixels, a switching time period per one switching to the circuit configuration corresponding to the attribute of the pixel;
a calculation unit that calculates, for each attribute of the pixels, a total switching time period to the circuit configuration corresponding to the attribute of the pixel by multiplying the number of times of switching by the switching time period when image processing is executed for the image data while dynamically changing the circuit configuration of the image processing unit;
a determination unit that determines, as a circuit configuration to be fixed, a predetermined number of circuit configurations in descending order of the calculated total switching time period, and
a control unit that controls to, when performing the image processing for the image data, i) extract the circuit configuration determined by the determination unit for a first image processing unit among the plurality of image processing units, ii) fix the circuit configuration of the first image processing unit to be the extracted circuit configuration, and iii) dynamically change the circuit configuration of a second image processing unit that is different from the first image processing unit among the plurality of image processing units.

2. The apparatus according to claim 1,
wherein said control unit changes the circuit configuration of said second image processing unit to the circuit configuration, determined by said determination unit, before the start of the image processing for the image data.

3. The apparatus according to claim 1, further comprising a setting unit that sets the number of image processing units to be made to have fixed circuit configurations.

4. A method for controlling an image processing apparatus including a plurality of image processing units that have variable circuit configurations, comprising:

inputting image data;
acquiring, for each attribute of a plurality of pixels, a number of times of switching to a circuit configuration corresponding to the attribute of the pixels when image processing is executed for the image data while dynamically changing the circuit configuration of the image processing unit;
acquiring, for each attribute of the pixels, a switching time period per one switching to the circuit configuration corresponding to the attribute of the pixel;
calculating, for each attribute of the pixels, a total switching time period to the circuit configuration corresponding to the attribute of the pixel by multiplying the number of times of switching by the switching time period when image processing is executed for the image data while dynamically changing the circuit configuration of the image processing unit;
determining, as a circuit configuration to be fixed, a predetermined number of circuit configurations in descending order of the calculated total switching time period, and
controlling the apparatus to, when performing the image processing for the image data, input in the inputting the image data i) extract the circuit configuration determined in the determination step for a first image processing unit among the plurality of image processing units, ii) fix the circuit configuration of the first image processing unit to be the extracted circuit configuration, and iii) dynamically change the circuit configuration of a second image processing unit that is different from the first image processing unit among the plurality of image processing units.

\* \* \* \* \*